United States Patent
Moffitt et al.

(10) Patent No.: US 10,458,861 B2
(45) Date of Patent: Oct. 29, 2019

(54) NON-CONTACT TEMPERATURE MEASUREMENT BY DUAL-WAVELENGTH SHIFT IN BREWSTER'S ANGLE

(71) Applicant: Applied Materials, Inc., Santa Clara, CA (US)

(72) Inventors: Theodore P. Moffitt, Hillsboro, OR (US); Naman Apurva, Bihar (IN)

(73) Assignee: APPLIED MATERIALS, INC., Santa Clara, CA (US)

(*) Notice: Subject to any disclaimer, the term of this patent is extended or adjusted under 35 U.S.C. 154(b) by 100 days.

(21) Appl. No.: 15/604,317

(22) Filed: May 24, 2017

(65) Prior Publication Data
US 2017/0343424 A1 Nov. 30, 2017

Related U.S. Application Data

(60) Provisional application No. 62/341,069, filed on May 24, 2016.

(51) Int. Cl.
*G01K 11/12* (2006.01)

(52) U.S. Cl.
CPC .................... *G01K 11/125* (2013.01)

(58) Field of Classification Search
CPC ..................................... G01K 11/125
See application file for complete search history.

(56) References Cited

U.S. PATENT DOCUMENTS 8,152,365 B2 * 4/2012 Timans ............... G01J 5/0003
250/339.11

2007/0009010 A1 * 1/2007 Shio ..................... G01K 11/125
374/161
2008/0198895 A1 8/2008 Davis et al.
(Continued)

FOREIGN PATENT DOCUMENTS

| JP | 2004064253 A | * | 2/2004 |
| TW | I363176 B | | 5/2012 |
| TW | I515416 B | | 1/2016 |

OTHER PUBLICATIONS

International Search Report and Written Opinion from PCT/US2017/034306 dated Aug. 16, 2017.
(Continued)

*Primary Examiner* — Clayton E. LaBalle
*Assistant Examiner* — Leon W Rhodes, Jr.
(74) *Attorney, Agent, or Firm* — Patterson + Sheridan LLP

(57) ABSTRACT

Embodiments disclosed herein relate to a thermal processing chamber having a substrate monitoring system. In one embodiment, a temperature monitoring system is disclosed herein. The temperature monitoring system includes a housing and a window defining an interior volume. The temperature monitoring system further includes two or more light sources, a camera, and a polarizer. The two or more light sources are disposed in the interior volume, beneath the window. A first light source of the two or more light sources has a first wavelength. A second light source of the two or more light sources has a second wavelength. A camera is disposed opposite the two or more light sources. The camera to captures a plurality of frames of two or more light beams received from the two or more light sources. The polarizer disposed in an optical path of the two or more light beams.

19 Claims, 6 Drawing Sheets

(56) References Cited

U.S. PATENT DOCUMENTS

| | | |
|---|---|---|
| 2009/0314205 A1 | 12/2009 | Patalay et al. |
| 2012/0183915 A1 | 7/2012 | Merry et al. |
| 2012/0308215 A1 | 12/2012 | Li |
| 2013/0248504 A1 | 9/2013 | Kusuda |
| 2013/0280824 A1 | 10/2013 | Ranish et al. |
| 2014/0284316 A1 | 9/2014 | Ji |

OTHER PUBLICATIONS

Taiwanese Office Action (with attached English translation) for Application No. 106116870; dated Feb. 12, 2019; 7 total pages.

\* cited by examiner

NON-CONTACT TEMPERATURE MEASUREMENT BY DUAL-WAVELENGTH SHIFT IN BREWSTER'S ANGLE

CROSS-REFERENCE TO RELATED APPLICATIONS

This application claims priority from U.S. Provisional Patent Application Ser. No. 62/341,069, filed May 24, 2016, which is hereby incorporated by reference in its entirety.

BACKGROUND

Field

Embodiments described herein generally relate to a processing chamber, and more specifically, to an apparatus for monitoring a temperature of a substrate during processing.

Description of the Related Art

Rapid thermal processing (RTP) is a term applied to several types of thermal processes including annealing, dopant activation, oxidation, and nitridation among others. The aforementioned processes may be performed at relatively high temperatures, above about 1000° C. It can be further applied to etching a chemical vapor deposition in the presence of precursor or etching gases. RTP typically depends upon an array of high-intensity incandescent lamps fit into a lamp head and directed at the substrate being processed.

A demand has arisen for RTP performed at temperatures below 500° C. and even below 250° C. to nearly room temperature. The RTP chamber may suffer some drawbacks in its use at lower temperature. The conventional RTP chamber uses a pyrometer for detecting a temperature of the substrate during processing. Generally, pyrometers are used for measuring high temperatures, for example, above 500° C. or 800° C. In the configuration of RTP chambers in which chamber parts are relatively warm and there is a light leakage from radiant bulbs, pyrometers are relatively ineffective at measuring substrate temperatures of less than about 450° C. This is because the substrate may be partially transparent at the lower temperatures and the chamber is not light tight. Thus, the pyrometers may measure the temperature of the surrounding chamber components rather than the substrate.

Therefore, an improved method and apparatus are needed for monitoring a temperature of a substrate during processing.

SUMMARY

Embodiments disclosed herein relate to a thermal processing chamber having a substrate monitoring system. In one embodiment, a temperature monitoring system is disclosed herein. The temperature monitoring system includes a housing and a window defining an interior volume. The temperature monitoring system further includes two or more light sources, a camera, and a polarizer. The two or more light sources are disposed in the interior volume, beneath the window. A first light source of the two or more light sources has a first wavelength. A second light source of the two or more light sources has a second wavelength. A camera is disposed opposite the two or more light sources. The camera captures a plurality of frames of two or more light beams from the two or more light sources. The polarizer disposed in an optical path of the two or more light beams.

In another embodiment, a thermal processing chamber is disclosed herein. The thermal processing system includes a chamber body, a substrate support, a radiant heating apparatus, and a temperature monitoring system. The chamber body defines an interior volume. The substrate support is disposed in the interior volume to support a substrate during processing. A radiant heating apparatus is coupled to the chamber body. The radiant heating apparatus directs radiant heat towards a top surface of the substrate. The temperature monitoring system disposed in the interior volume, opposite the radiant heating apparatus. The temperature monitoring system includes a housing and a window defining an interior volume. The temperature monitoring system further includes two or more light sources, a camera, and a polarizer. The two or more light sources are disposed in the interior volume, beneath the window. Each of the two or more light sources direct light towards a bottom surface of a substrate such that a beam of light creates an angle of incidence equal to a Brewster's angle with the substrate. The camera is disposed opposite the two or more light sources, The camera captures a plurality of frames of two or more light beams from the two or more light sources. The polarizer is disposed in an optical path of the two or more light beams.

In another embodiment, a method for monitoring a temperature of a substrate is disclosed herein. Two or more light beams are provided from two or more light sources to a bottom surface of the substrate. The two or more light beams contact the bottom surface of the substrate at a Brewster's angle. The two or more light beams reflected from the bottom surface of the substrate are captured by a camera. The camera captures a plurality of frames of the light beams. The camera communicates with a controller the plurality of frames of the light beams. The controller can determine a temperature of the substrate based on wavelength of the two or more light beams. The process parameters for the substrate are adjusted based on the determined temperature.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

Figure 1A:
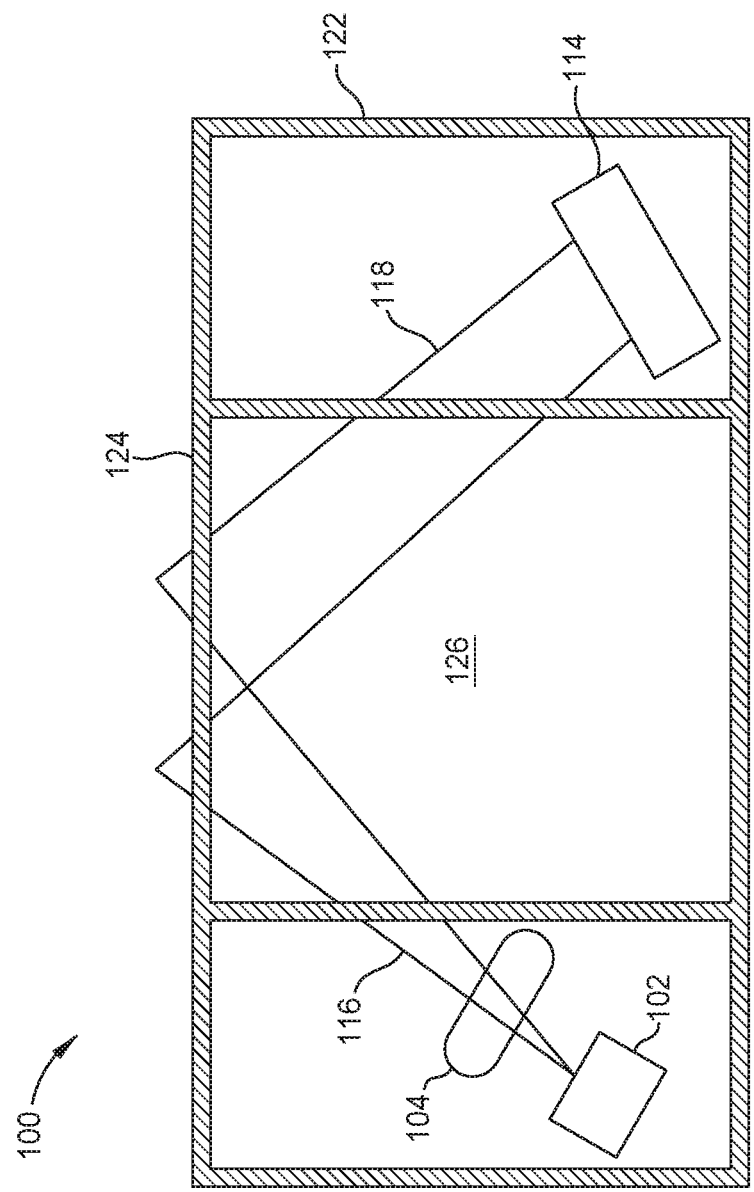
FIG. 1A illustrates a temperature monitoring apparatus, according to one embodiment.

For clarity, identical reference numerals have been used, where applicable, to designate identical elements that are common between figures. Additionally, elements of one embodiment may be advantageously adapted for utilization in other embodiments described herein. Directional language such as "above," "below," "adjacent," and the like do not refer to an absolute direction, but are relative to a basis of an apparatus being described, which is apparent from the orientation shown in the figures.

DETAILED DESCRIPTION

FIG. 1A illustrates a temperature monitoring system 100, according to one embodiment. The temperature monitoring system 100 measures a temperature of a substrate during processing. The temperature monitoring system 100 includes a housing 122 and a transparent window 124 defining an interior volume 126. The temperature monitoring system 100 further includes two or more light sources 102 and a camera. In one embodiment, each of the two or more light sources 102 are broadband light sources. In one embodiment, each of the two or more light sources provide a wavelength between about 400 nm and 2000 nm. In the embodiment shown in FIG. 1, only a single light source 102 is shown to avoid clutter of the figure. Each light source 102 provides a light beam 116 to a surface of the substrate. For example, in the configuration shown in FIG. 1, each light source 102 is provides the light beam 116 to a bottom surface of the substrate (not shown). In one embodiment, the substrate is positioned exterior to the interior volume 126. The camera 114 receives a reflected light beam 118 that is the resultant of the light beam 116 reflecting off the substrate. In an embodiment, the camera 114 may be a high speed camera, such as, a camera capable of capturing 250 frames per second or more. In another embodiment, the camera 114 may be a line camera.

The temperature monitoring system 100 may further include a polarizer 104. In one embodiment, the polarizer 104 is stacked above each light source 102. In another embodiment, the polarizer 104 is stacked below each light source 102. The polarizer 104 receives the light beam 116 from the two or more light sources 102 and filters the beam such that only a specific polarization passes through the polarizer 104. In one embodiment, the polarizer 104 only allows P-polarized light through and reflects the S-polarized light.

The polarized light is directed to the bottom of the substrate. For example, the polarized light is directed to the bottom of the substrate, such that a cone of light reflects off the bottom of the substrate. The cone of light may comprise a plurality of beams, with each beam contacting a bottom of the substrate at a different angle. For example, the cone of light may comprise a plurality of beams reflecting off of the substrate at a plurality of angles, wherein the plurality of angles encompasses the Brewster's angle. A variety of angles results in the overall range of angles to continually include the Brewster's angle, as the Brewster's angle shifts as temperature of the substrate changes. The reflected light beam 118 reflects off the bottom of the substrate, and is directed towards the camera 114.

Figure 1B:
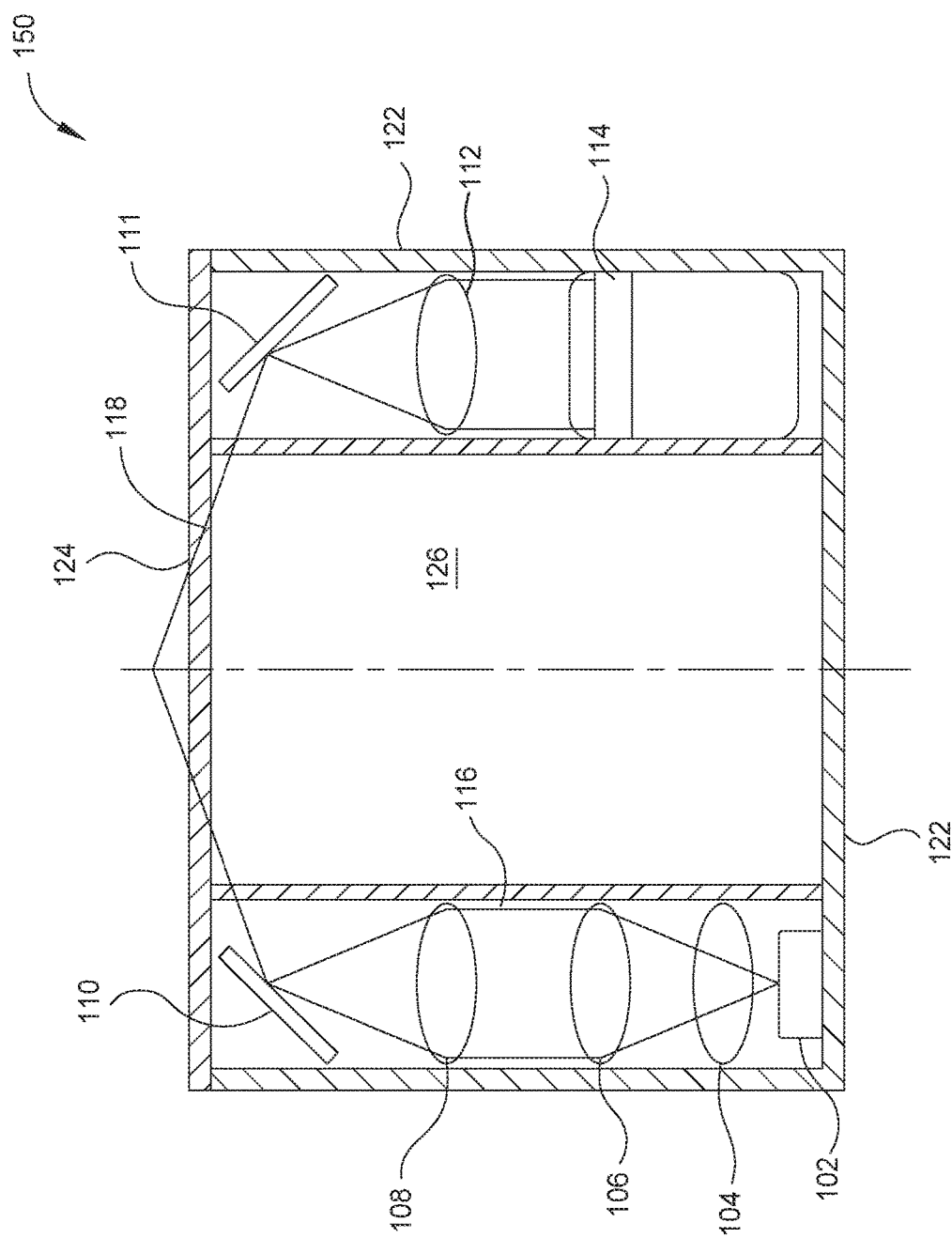
FIG. 1B illustrates a temperature monitoring apparatus, according to one embodiment.

FIG. 1B illustrates a temperature monitoring system 150, according to one embodiment. The temperature monitoring system 150 is substantially similar to temperature monitoring system 100. The temperature monitoring system 150 further comprises a first collimating lens 106, a focusing lens 108, a first mirrors 110, and a second collimating lens 112. In one embodiment, the polarizer 104, first collimating lens 106, focusing lens 108, and first mirror 110 are stacked above the two or more light sources 102. In another embodiment, the polarizer 104, first collimating lens 106, focusing lens 108, and mirror 110 are stacked below the two or more light sources 102.

The polarized light is directed to the first collimating lens 106. The first collimating lens 106 is narrows the polarized light, and aligns the beam. The polarized light then travels to the focusing lens 108. The focusing lens 108 receives the light beam 116 from the collimating lens 106 and focuses the light beam 116 on an area of interest on the first mirror 110. The first mirror 110 receives the focused light beam 116 from the focusing lens 108 and reflects the light to an area of interest on the substrate. The first mirror 110 may be adjusted (e.g., tilted, raised, etc.) to change the location on the substrate where the light beam 116 is direct.

The first mirror 110 may be oriented to reflect an incoming light beam at an angle greater than 90° so the reflected light illuminates a location of the substrate, which is typically located such that the first mirror 110 is between the substrate and the focusing lens 108. At one orientation, the light reflected from the first mirror 110 to the substrate arrives at the substrate in a direction that corresponds to Brewster's angle.

The reflected light beam 118 reflects off the substrate, and travels towards the second mirror 111. The second mirror 111 directs the reflected light beam 118 towards the second collimating lens 112. The second mirror 111 may be adjusted (e.g., tilted, raised, etc.) such that the second mirror 111 is in position to receive the reflected light beam 118, and direct the reflected light beam 118 towards the collimating lens 112. The second collimating lens 112 receives the reflected light beam 118 and direct the reflected light beam 118 towards the camera 114. The second collimating lens 112 may narrow the polarized light, and align the reflected light beam 118 as it is captured by the camera 114. In one embodiment, the camera 114 may be a high speed camera.

Figure 2:
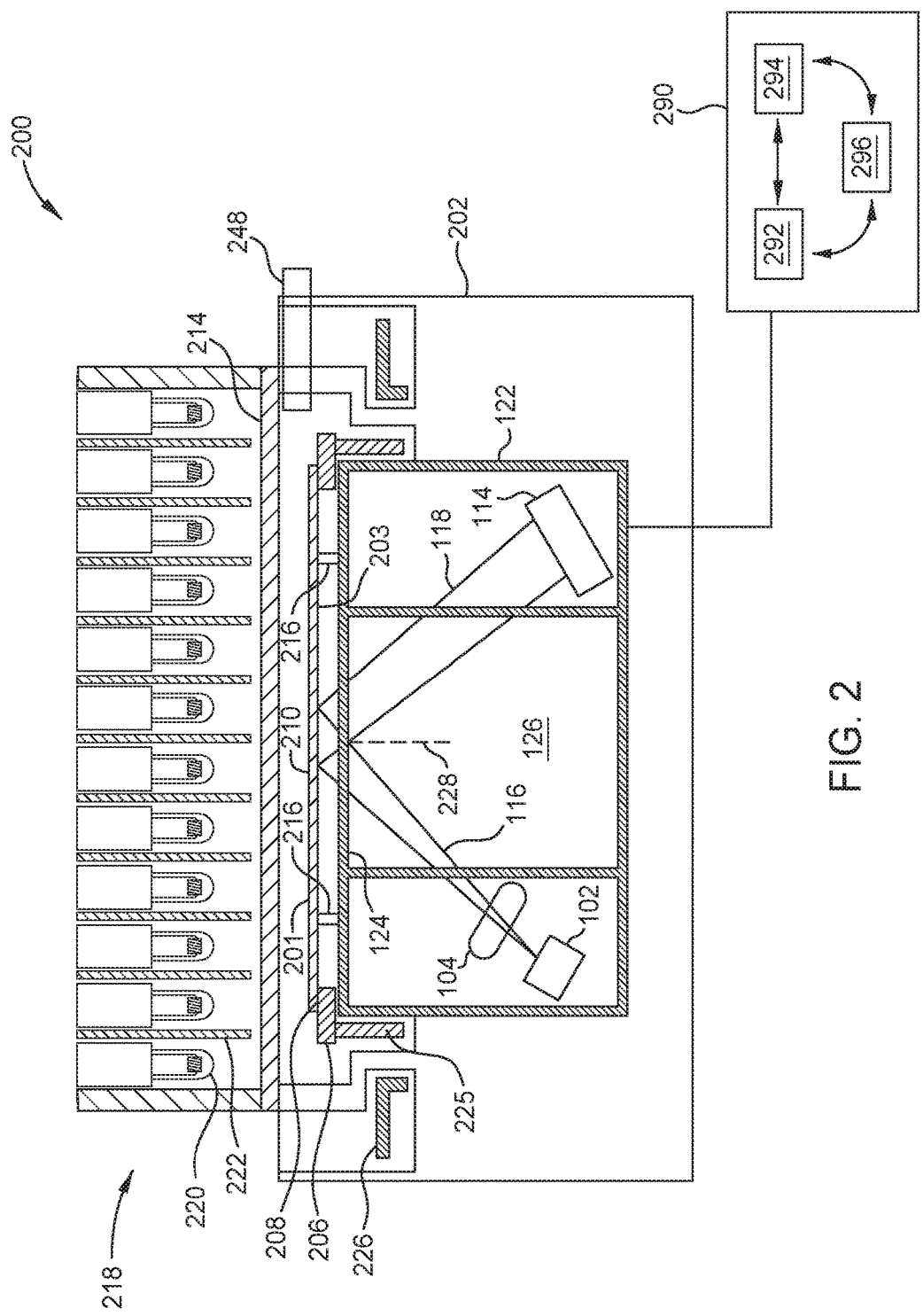
FIG. 2 is a cross-sectional view of a thermal processing chamber equipped with the temperature monitoring system of FIG. 1A, according to one embodiment.

FIG. 2 is a cross-sectional view of a thermal processing chamber 200 equipped with the temperature monitoring system 100, according to one embodiment. The chamber 200 may be used to practice the method described herein. An exemplary thermal processing chamber 200 is the RADIANCE® chamber, available from Applied Materials, Inc., of Santa Clara, Calif. Other systems or platforms from other manufacturers may also be used to house the temperature monitoring system 100.

The chamber 200 includes a chamber body 202. The chamber body 202 defines an interior volume 204 of the chamber 200. The chamber 200 includes a substrate support 206 disposed in the interior volume 204. The substrate support 206 supports a substrate 201 loaded through an opening 248 on its periphery. In one embodiment, the substrate support 206 may be an edge ring having a sloping shelf 208 contacting a corner of the substrate 201. The substrate 201 is oriented such that a top surface 210 of the substrate 201 faces a process area 212 defined by a transparent quartz window 214. Life pins 216 may be raised and lowered to support the back side of the substrate 201 when the substrate 201 is handed between a substrate handler bringing the substrate 201 into the chamber 200 and onto the substrate support 206.

In one embodiment, the substrate support 206 is positioned on a rotatable cylinder 225 that is magnetically coupled to a rotatable flange 226 positioned outside the chamber 200. A motor (not shown) rotates the flange 226 and hence rotates the substrate 201 about its center 228, which is also the centerline of the generally symmetric chamber.

The chamber 200 further includes a radiant heating apparatus 218 positioned on an opposite side of the window 214, above the substrate support 206. The radiant heating apparatus 218 directs radiant energy towards the substrate support 206 to heat the substrate 201. The radiant heating apparatus 218 includes a plurality of lamps 220 positioned in reflective tubes 222 arranged in a close-packed arrangement. In one embodiment, the radiant heating apparatus 218 has a large number (e.g., 409) of high-intensity tungsten-halogen lamps 220. In another embodiment, other radiant heating apparatuses may be substituted. Generally, these involve resistive heating to quickly ramp up the temperature of the radiant source.

The chamber 200 further includes the temperature monitoring system 100 disposed in the chamber 200, beneath the substrate 201. The temperature monitoring system 100 measures a temperature of the substrate 101 as the substrate undergoes thermal processing. The temperature of the substrate 101 is measured by shooting a beam of light from the light source to a bottom surface 203 of the substrate 201. The beam of light reflects off the bottom surface of the substrate 201 and is captured by the camera. The camera captures the wavelength of the reflected light off the bottom surface of the substrate 201. The camera is in communication with a controller 290. The controller 290 converts the measured wavelength of the received light to a temperature of the substrate 201.

A demand has arisen for RTP performed at temperatures below 500° C. and even below 250° C. to nearly room temperature. Conventional RTP chambers may suffer some drawbacks in its use at lower temperature. The conventional RTP chamber uses a pyrometer for detecting a temperature of the substrate during processing. Generally, pyrometers are used for measuring high temperatures, for example, above 500° C. or 800° C. In the configuration of RTP chambers in which chamber parts are relatively warm and there is a light leakage from radiant bulbs, pyrometers are relatively ineffective at measuring substrate temperatures of less than about 450° C. This is because the substrate may be partially transparent at the lower temperatures and the chamber is not light tight. Thus, the pyrometers may measure the temperature of the surrounding chamber components rather than the substrate. The temperature monitoring system 100 provides a way to measure the temperature of the substrate 201 during processing at temperatures for which a pyrometer cannot measure.

The controller 290 may operate all aspects of the processing chamber 200, such as the method disclosed below in conjunction with FIGS. 3A and 3B. For example, the controller 290 may measure a temperature of the substrate 201 by receiving data from the temperature monitoring system 100.

The controller 290 includes a programmable central processing unit (CPU) 292 that is operable with a memory 294 and a mass storage device, an input control unit, and a display unit (not shown), such as power supplies, clocks, cache, input/output (I/O) circuits, and the liner, coupled to the various components of the processing system to facilitate control of the substrate processing.

To facilitate control of the chamber 200 described above, the CPU 292 may be one of any form of general purpose computer processor that can be used in an industrial setting, such as a programmable logic controller (PLC), for controlling various chambers and sub-processors. The memory 294 is coupled to the CPU 292 and the memory 294 is non-transitory and may be two or more of readily available memory such as random access memory (RAM), read only memory (ROM), floppy disk drive, hard disk, or any other form of digital storage, local or remote. Support circuits 296 are coupled to the CPU 292 for supporting the processor in a conventional manner. Charged species generation, heating, and other processes are generally stored in the memory 294, typically as software routine. The software routine may also be stored and/or executed by a second CPU (not shown) that is remotely located from the hardware being controlled by the CPU 292.

The memory 294 is in the form of computer-readable storage media that contains instructions, that when executed by the CPU 292, facilitates the operation of the chamber 200. The instructions in the memory 294 are in the form of a program product such as a program that implements the method of the present disclosure. The program code may conform to any one of a number of different programming languages. In one example, the disclosure may be implemented as a program product stored on a computer-readable storage media for use with a computer system. The program(s) of the program product define functions of the embodiments (including the methods described herein). Illustrative computer-readable storage media include, but are not limited to: (i) non-writable storage media (e.g., read-only memory devices within a computer such as CD-ROM disks readable by a CD-ROM drive, flash memory, ROM chips, or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the methods described herein, are embodiments of the present disclosure.

Figure 3A:
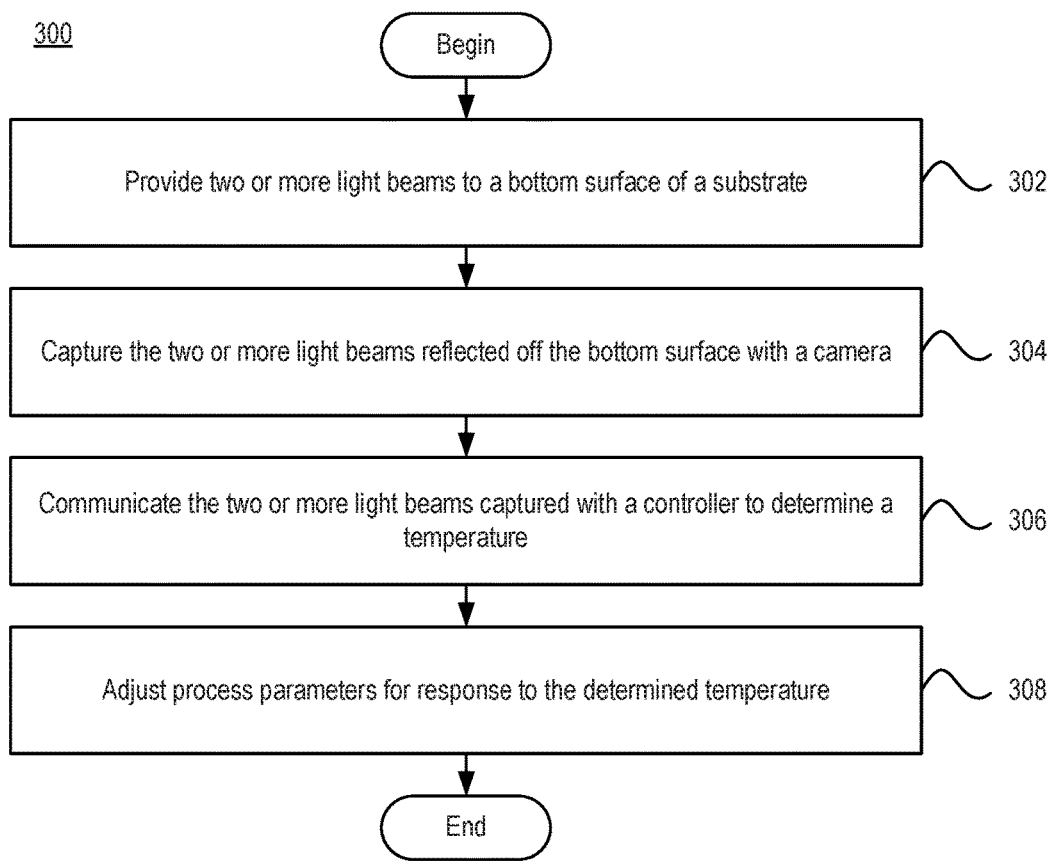
FIG. 3A illustrates a method of monitoring a temperature of the substrate, according to one embodiment.

FIG. 3A illustrates a method 300 of measuring a temperature of a substrate, according to one embodiment. For example, method 300 may be carried out with the temperature monitoring system 100 in the processing chamber 200 described above in conjunction with FIGS. 1A and 2.

The method 300 begins at block 302. At block 302, two or more light beams are provided by the light sources 102 to a bottom surface of the substrate. Each of the two or more light beams may be provided by a broadband light source, such as LEDs. In another embodiment, each of the light beams may be provided by a light source having a wavelength ranging from 400 nm to 2000 nm. Each light beam is set through a polarizer (e.g., polarizer 104). In one example, the polarizer allows P-polarized light through and reflects S-polarized light. The two or more light beams contact a bottom surface of the substrate. Each of the two or more light beams contact the bottom of the substrate, forming a cone of light reflecting off the bottom of the substrate. The cone of light comprises a plurality of beams of light contacting the bottom of the substrate at a plurality of angles. The plurality of angles comprises a range of angles that includes the Brewster's angle. The Brewster's angle (or polarization angle) is an angle of incident at which light with a particular polarization is perfectly transmitted through a transparent dielectric surface with no reflection.

At block 304, the camera captures a plurality of frames of the two or more light beams reflected of the bottom surface of the substrate. The two or more light beams reflect off the bottom surface of the substrate and are directed to the camera.

At block 306, the camera communicates the plurality of frames to a controller. The controller determines a temperature of the substrate based on the observed wavelength of the reflected two or more beams. At block 308, the controller may communicate with the chamber to adjust processing parameters in response to the measured temperature of the substrate. In one embodiment, the method 300 may continue throughout substrate processing. In another embodiment, the method 300 may be selectively run throughout substrate processing, such as during specific time frames.

Figure 3B:
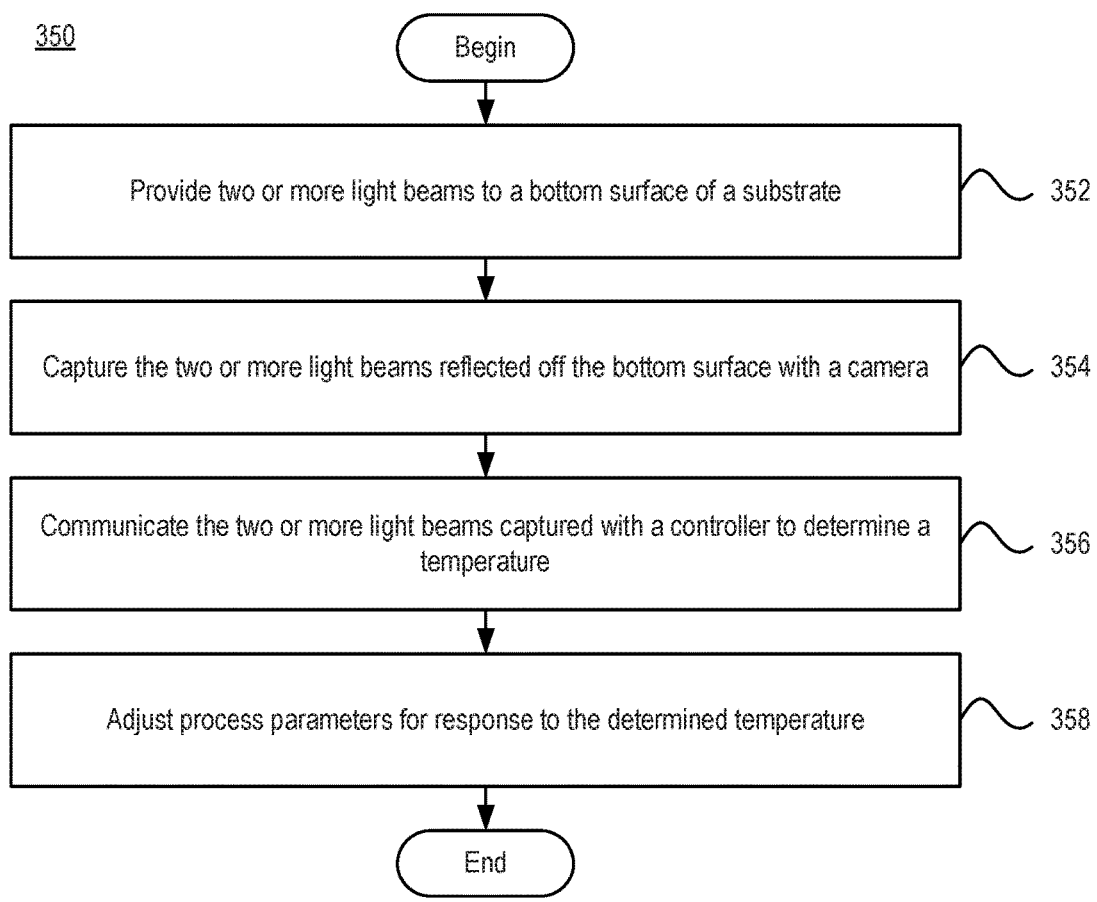
FIG. 3B illustrates a method of monitoring a temperature of the substrate, according to one embodiment.

FIG. 3B illustrates a method 350 of measuring a temperature of a substrate, according to one embodiment. For example, method 250 may be carried out with the temperature monitoring system 150 in the processing chamber 200 described above in conjunction with FIGS. 1B and 2.

The method 350 begins at block 352. At block 352, two or more light beams are provided by the light source to a bottom surface of the substrate. The two or more light beams may be provided by two or more broadband light sources, such as LEDs. The light beams are sent through a polarizer to allow only a specific polarization to pass through the polarizer. In one example, the polarizer is lets P-polarized light through and reflect the S-polarized light. The light then travels to a collimator. The collimator narrows the polarized light, and aligns the beams. The collimator directs the beams towards a focusing lens. The focusing lens focuses the light beams on a given area of a mirror, such that the light beams reflect off the mirror and contact a bottom surface of the substrate. The mirror may be adjusted such that the light beams contact the bottom surface of the substrate at the Brewster's angle. The Brewster's angle (or polarization angle) is an angle of incidence at which light with a particular polarization is perfectly transmitted through a transparent dielectric surface with no reflection. The mirror may be adjusted such that the light beams reflect off the mirror, towards the bottom surface of the substrate, to achieve the Brewster's angle for each beam.

At block 354, the camera captures a plurality of frames of the two or more light beams reflected off the bottom surface of the substrate. The two or more light beams reflect off the bottom surface of the substrate and are directed to a second mirror. The second mirror is positioned to receive the two or more reflected light beams, and direct the two or more light beams to a collimating lens. The collimating lens aligns the two or more light beams such that the two or more light beams are directed to the camera. The camera captures a plurality of frames of the two or more reflected light beams.

At block 356, the camera communicates the plurality of frames to a controller. The controller determines a temperature of the substrate based on the observed wavelength of the reflected two or more beams. At block 358, the controller may communicate with the chamber to adjust processing parameters in response to the measure temperature of the substrate. In one embodiment, the method 350 may continue throughout substrate processing. In another embodiment, the method 350 may be selectively run throughout substrate processing, such as during specific time frames.

Figure 4:
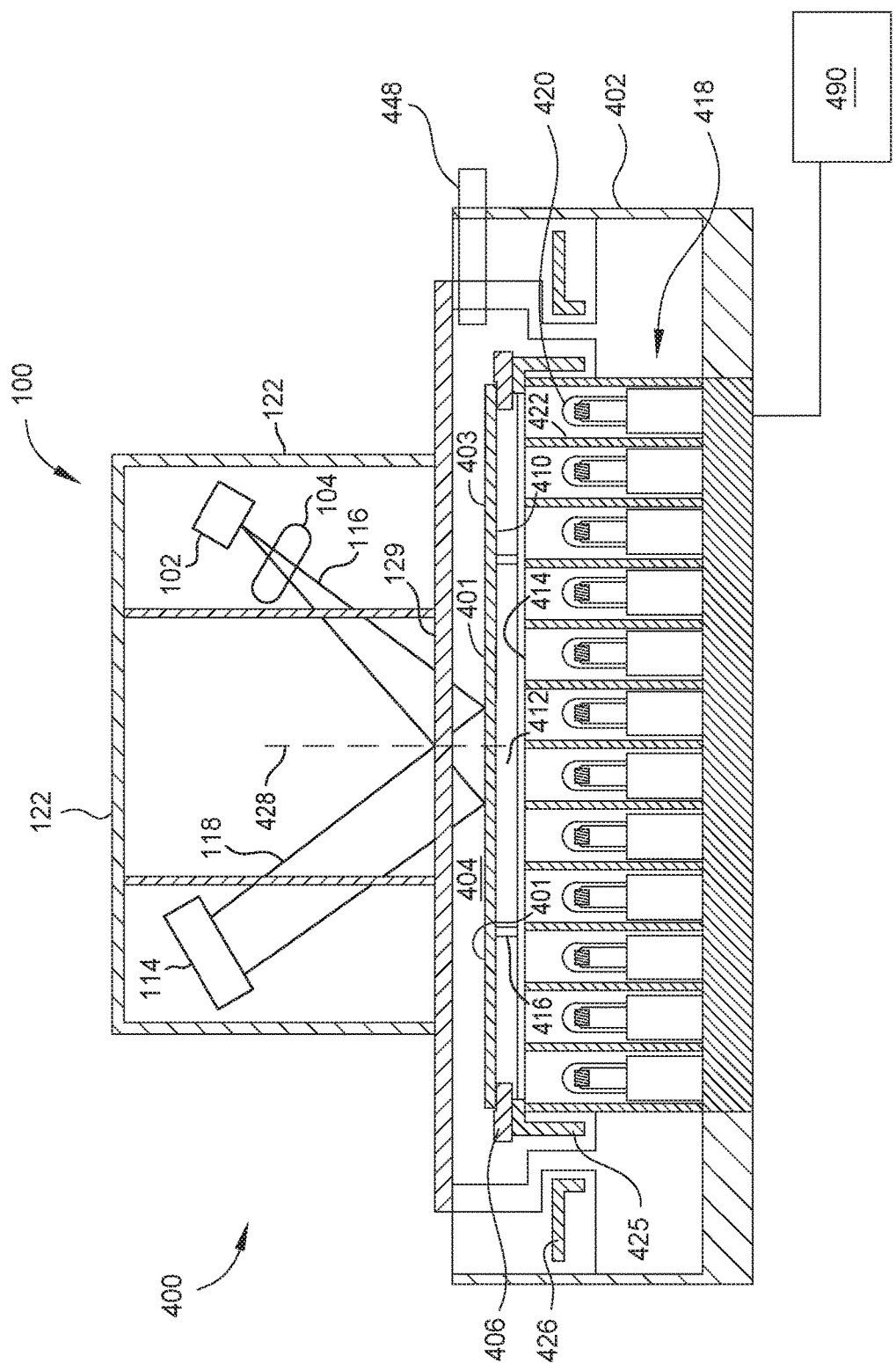
FIG. 4 is a cross-sectional view of a thermal processing chamber equipped with the temperature monitoring system of FIG. 1A, according to one embodiment.

FIG. 4 is a cross-sectional view of a thermal processing chamber 400 equipped with the temperature monitoring system 100, according to one embodiment. Thermal processing chamber 400 may also be equipped with the temperature monitoring system 150, similarly. The chamber 400 may be used to practice the method described herein. An exemplary thermal processing chamber 400 is the VULCAN® chamber, available from Applied Materials, Inc., of Santa Clara, Calif. Other systems or platforms from other manufacturers may also be used to house the temperature monitoring system 100.

The chamber 400 includes a chamber body 402. The chamber body 402 defines an interior volume 404 of the chamber 400. The chamber 400 includes a substrate support 406 disposed in the interior volume 404. The substrate support 406 supports a substrate 401 on its periphery. In one embodiment, the substrate support 406 may be an edge ring having a sloping shelf 208 contacting a corner of the substrate 401. The substrate 401 is oriented such that a top surface 410 of the substrate 401 faces a process area 412 defined by a transparent quartz window 414. Life pins 416 may be raised and lowered to support the front side of the substrate 401 when the substrate 401 is handed between a substrate handler bringing the substrate 401 into the chamber 400 and onto the substrate support 406 via opening 448.

In one embodiment, the substrate support 406 is positioned on a rotatable cylinder 425 that is magnetically coupled to a rotatable flange 426 positioned outside the chamber 400. A motor (not shown) rotates the flange 426 and hence rotates the substrate 401 about its center 428, which is also the centerline of the generally symmetric chamber.

The chamber 400 further includes a radiant heating apparatus 418 positioned on an opposite side of the window 414, below the substrate support 406. The radiant heating apparatus 418 directs radiant energy towards the substrate support 406 to heat the substrate 401. The radiant heating apparatus 418 includes a plurality of lamps 420 positioned in reflective tubes 422 arranged in a close-packed arrangement. In one embodiment, the radiant heating apparatus 418 has a large number (e.g., 409) of high-intensity tungsten-halogen lamps 420. In another embodiment, other radiant heating apparatuses may be substituted. Generally, these involve resistive heating to quickly ramp up the temperature of the radiant source.

The chamber 400 further includes the temperature monitoring system 100 disposed in the chamber 400, above the substrate 201. The temperature monitoring system 100 measures a temperature of the substrate 401 as the substrate undergoes thermal processing. The temperature of the substrate 401 is measured by directing a beam of light from the light source to a bottom surface 403 of the substrate 401. The beam of light reflects off the bottom surface of the substrate 401 and is captured by the camera. The camera captures the wavelength of the reflected light off the bottom surface of the substrate 401. The camera is in communication with a controller 490. The controller 490 converts the measured wavelength of the received light to a temperature of the substrate 401 based on a predetermined relation between temperature and Brewster's angle.

The temperature monitoring systems 100, 150 allow for temperature monitoring of the substrate during RTP processing that was not possible with conventional pyrometers. By monitoring the temperature of the substrate, the temperature monitoring system enhances substrate uniformity and processing.

While the foregoing is directed to specific embodiments, other and further embodiments may be devised without departing from the basic scope thereof, and the scope thereof is determined by the claims that follow.

What is claimed is:

1. A temperature monitoring system, comprising:
   a housing and a window defining an interior volume;
   two or more light sources placed to project two or more light beams along substantially the same optical path and disposed in the interior volume, beneath the window, wherein a first light source of the two or more light sources has a first wavelength and a second light source of the two or more light sources has a second wavelength;

a camera disposed opposite the two or more light sources, wherein the camera is positioned to capture a plurality of frames of the two or more light beams from the two or more light sources, and the camera is coupled to a controller that determines a temperature of a substrate based on the wavelengths of the two or more light beams captured by the camera; and a polarizer disposed in an optical path of the two or more light beams.

2. The temperature monitoring system of claim 1, further comprising:

a collimator positioned between the polarizer and the window, the collimator disposed in the optical path;

a first mirror disposed in the optical path between the collimator and the window, the first mirror positioned to reflect light directed by the collimator towards a bottom surface of the substrate such that the beam creates an angle of incidence equal to a Brewster's angle; and a second mirror disposed opposite the first mirror, the second mirror positioned to direct the two or more light beams to the camera.

3. The temperature monitoring system of claim 2, further comprising:

a focus lens disposed in the optical path between the collimator and the polarizer, the focus lens positioned to focus the two or more light beams on an area of the first mirror.

4. The temperature monitoring system of claim 2, further comprising:

a second collimator disposed between the second mirror and the camera, the second collimator positioned to direct the two or more light beams to the camera.

5. The temperature monitoring system of claim 2, wherein the first mirror is movable such that the angle of incidence of the two or more light beams and the substrate may be changed.

6. The temperature monitoring system of claim 2, wherein the second mirror is movable such that the second mirror as able to receive the two or more light beams reflected from the substrate and direct the two or more light beams towards the camera.

7. The temperature monitoring system of claim 1, wherein each of the two or more light sources are broadband light sources.

8. The temperature monitoring system of claim 1, each of the two or more light sources the two or more light beams towards an object, wherein the two or more light beams comprises a plurality of angles of incidences.

9. The temperature monitoring system of claim 1, wherein the camera is coupled to a controller that uses wavelengths of the two or more light beams captured by the camera to determine a temperature of the substrate.

10. A thermal processing chamber, comprising:

a chamber body defining a first interior volume;

a substrate support disposed in the first interior volume, the substrate support positioned to support the substrate during processing;

a radiant heating apparatus coupled to the chamber body, the radiant heating apparatus positioned to direct radiant heat towards a top surface of the substrate; and a temperature monitoring system disposed in the first interior volume, opposite the radiant heating apparatus, the temperature monitoring system comprising:

a housing and a window defining a second interior volume;

two or more light sources disposed in the second interior volume, beneath the window, each of the two or more light sources positioned to direct two or more light beams along substantially the same optical path and towards a bottom surface of the substrate such that the two or more light beams creates an angle of incidence equal to a Brewster's angle with the substrate;

a camera disposed opposite the two or more light sources, the camera positioned to capture a plurality of frames of two or more light beams from the two or more light sources, and configured to facilitate determination of a temperature of the substrate from wavelengths of the two or more light sources; and a polarizer disposed in an optical path of the two or more light beams.

11. The thermal processing chamber of claim 10, further comprising:

a collimator positioned between the polarizer and the window, the collimator disposed in the optical path;

a first mirror disposed in the optical path between the collimator and the window, the mirror positioned to reflect light directed by the collimator towards a bottom surface of the substrate such that the beam creates an angle of incidence equal to the Brewster's angle; and a second mirror disposed opposite the first mirror, the second mirror positioned to direct the two or more light beams to the camera.

12. The thermal processing chamber of claim 11, further comprising:

a focus lens disposed in the optical path between the collimator and the polarizer, the focus lens positioned to focus the two or more light beams on an area of the first mirror.

13. The thermal processing chamber of claim 11, further comprising:

a second collimator disposed between the second mirror and the camera, the second collimator positioned to direct the two or more light beams to the camera.

14. The thermal processing chamber of claim 11, wherein the first mirror is movable such that the angle of incidence of the two or more light beams and the substrate may be changed.

15. The thermal processing chamber of claim 11, wherein the second mirror is movable such that the second mirror is able to receive the two or more light beams reflected from the substrate and direct the two or more light beams towards the camera.

16. The thermal processing chamber of claim 10, wherein the two or more light sources are broadband light sources.

17. The thermal processing chamber of claim 10, wherein the two or more light sources have a wavelength between 400 nm and 2000 nm.

18. A method of monitoring a temperature of a substrate, comprising:

providing two or more light beams from two or more light sources, the two or more light beams following substantially the same optical path, to a bottom surface of the substrate, wherein the two or more light beams contact the bottom surface of the substrate at a Brewster's angle;

capturing the two or more light beams reflected from the bottom surface of the substrate in a camera, the camera positioned to capture a plurality of frames of the light beams;

communicating with a controller the plurality of frames of the light beams, such that the controller can determine a temperature of the substrate based on wavelength of the two or more light beams; and adjusting process parameters for the substrate based on the determined temperature.

19. The method of monitoring a temperature of a substrate of claim 18, wherein the two or more light beams contact the bottom surface of the substrate at the Brewster's angle comprises:

adjusting two or more mirrors such that the two or more light beams contact the bottom surface of the substrate at the Brewster's angle.

* * * * *